US010560482B2

(12) United States Patent
Verma et al.

(10) Patent No.: US 10,560,482 B2
(45) Date of Patent: Feb. 11, 2020

(54) NETWORK ACCESS BY APPLICATIONS IN AN ENTERPRISE MANAGED DEVICE SYSTEM (71) Applicant: VMWARE, INC., Palo Alto, CA (US)

(72) Inventors: Gaurav Verma, Bangalore (IN); Suchit Shivashankar, Bangalore (IN); Don Joy, Bangalore (IN)

(73) Assignee: VMware, Inc., Palo Alto, CA (US)

(*) Notice: Subject to any disclaimer, the term of this patent is extended or adjusted under 35 U.S.C. 154(b) by 273 days.

(21) Appl. No.: 15/795,286

(22) Filed: Oct. 27, 2017

(65) Prior Publication Data

US 2019/0014152 A1 Jan. 10, 2019

(30) Foreign Application Priority Data

Jul. 8, 2017 (IN) .............................. 201741024105

(51) Int. Cl.
*H04L 9/00* (2006.01)
*H04L 29/06* (2006.01)
*H04W 12/08* (2009.01)

(52) U.S. Cl.
CPC ............ *H04L 63/20* (2013.01); *H04L 63/101* (2013.01); *H04W 12/08* (2013.01)

(58) Field of Classification Search
CPC ...... H04L 63/20; H04L 63/101; H04W 12/08; H04W 12/0027
See application file for complete search history.

(56) References Cited

U.S. PATENT DOCUMENTS

| 9,705,883 | B2* | 7/2017 | Zhu | ........................ H04W 12/08 |
|---|---|---|---|---|
| 10,341,346 | B2* | 7/2019 | Yasaki | |
| 2006/0167871 | A1* | 7/2006 | Sorenson | ............ H04L 29/1216 |
| 2012/0003958 | A1* | 1/2012 | Hossain | ................ H04L 63/101 455/411 |
| 2014/0115646 | A1* | 4/2014 | Rajgopal | ............ H04N 21/4622 725/110 |
| 2014/0365646 | A1* | 12/2014 | Xiong | ................... H04L 63/101 709/224 |
| 2016/0044157 | A1* | 2/2016 | Chen | ................. H04M 1/72577 455/418 |
| 2016/0187458 | A1* | 6/2016 | Shah | ....................... G01S 5/021 455/456.1 |
| 2017/0177908 | A1* | 6/2017 | Roper | ..................... G06F 3/061 |
| 2018/0013778 | A1* | 1/2018 | Lim | .................... H04L 63/1425 |

* cited by examiner

*Primary Examiner* — Beemnet W Dada (74) *Attorney, Agent, or Firm* — Thomas | Horstemeyer, LLP (57) ABSTRACT Disclosed are various examples for enforcing network access permissions on applications that are installed on a client device. A network whitelist or network blacklist can be deployed by a management service onto a managed client device. A management component can facilitate enforcement of the whitelist and/or blacklist to enforce network access rules on installed applications.

20 Claims, 5 Drawing Sheets

NETWORK ACCESS BY APPLICATIONS IN AN ENTERPRISE MANAGED DEVICE SYSTEM

RELATED APPLICATION

Benefit is claimed under 35 U.S.C. 119(a)-(d) to Foreign Application Serial No. 201741024105 filed in India entitled "NETWORK ACCESS BY APPLICATIONS IN AN ENTERPRISE MANAGED DEVICE SYSTEM", filed on Jul. 8, 2017 by VMware, Inc, which is herein incorporated in its entirety by reference for all purposes.

BACKGROUND

An enterprise can use a management service capable of protecting enterprise data, like email and corporate documents, from theft, data loss, and unauthorized access. The enterprise can require devices used by employees to be enrolled with the management service to protect enterprise data. These managed devices can include enterprise-owned devices and bring-your-own-device (BYOD) technologies. With the emerging use of BYOD technologies by enterprises, management systems are increasingly likely to require support for a variety of devices and a variety of platforms. Platforms that include features or options directed to supporting both enterprise use and personal use can be referred to as management platforms. Management platforms include versions of the Android operating system. When used in an enterprise setting, Android can be referred to as "Android enterprise," "Android in the enterprise," or "Android for Work."

Management of these devices in an enterprise environment can provide various management options for an administrator. An administrator can define and enforce compliance policies or rules on a particular device. The administrator can also push applications to a user's enrolled device. The administrator can also cause various profiles to be installed on a user's device, such as a security certificate, wireless network credentials, authentication tokens, or other data. The administrator can leverage a management service that is executed remotely from a user's device that is in communication with a management component or application that is installed on the user's device. The management component can enforce policies or rules, install or delete data from the device, or take other enforcement actions on the device on behalf of the management service.

In some scenarios, an administrator might wish to impose restrictions on applications that are installed on the user's device, such as when they are permitted to access a network connection of the device. However, without modifying the application code itself, it can be difficult to enforce these restrictions.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to enforcing networking restrictions on various applications that are installed on a user's client device. In particular, in the case of a managed client device that is enrolled with a management platform, examples of the disclosure can enforce network access rules on applications that are installed on the client device. Examples of the disclosure can use various approaches. First, the operating system network permissions for a particular application can be modified to enforce rules specified by a network whitelist or blacklist. Another approach involves installing and registering a global proxy on the user's device through which network traffic is routed, which can enforce network whitelist or blacklist rules. A third approach involves leveraging an operating system application programming interface (API) that allows the operating system to restrict certain applications' usage of background data or a network connection to enforce network whitelist or blacklist rules.

Figure 1:
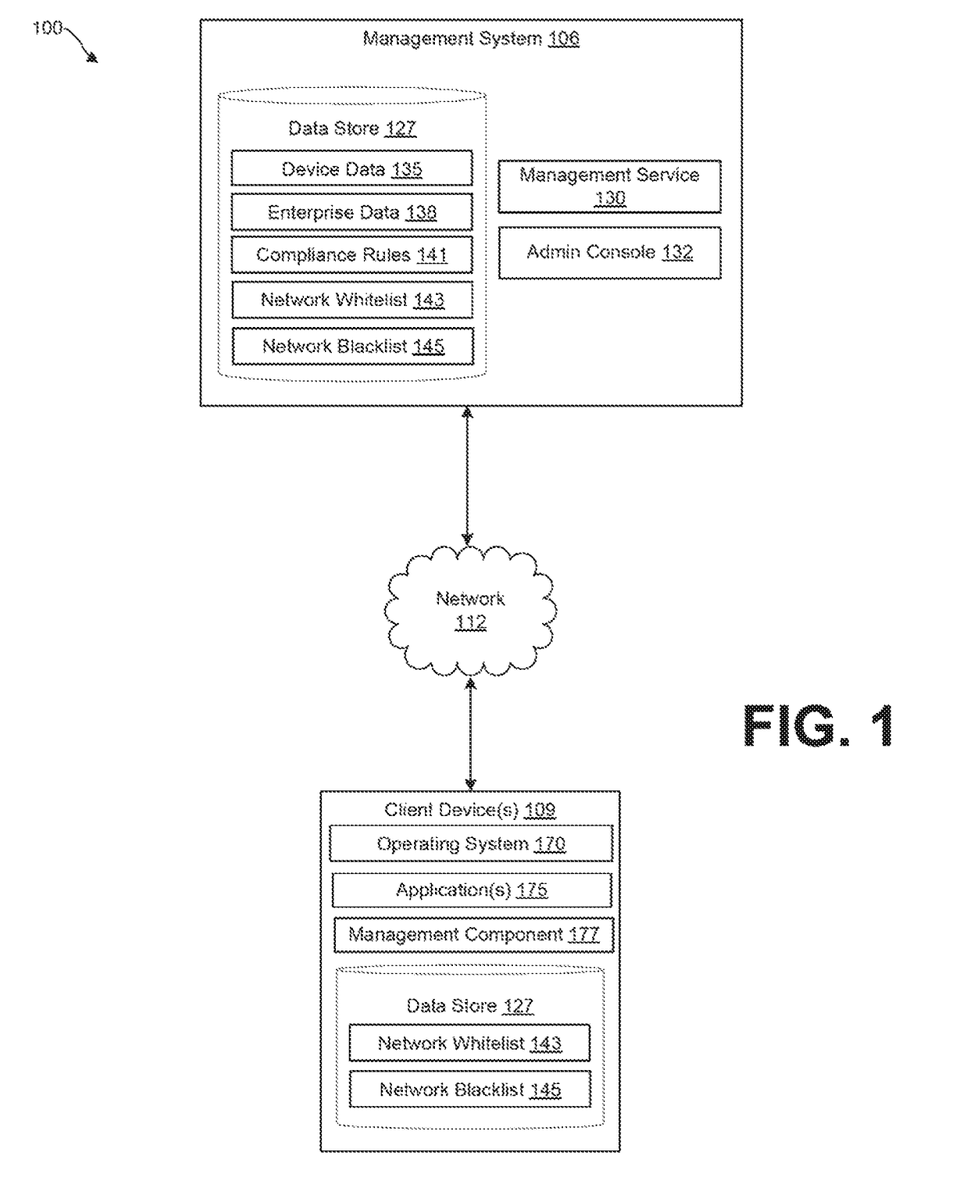
FIG. 1 is a drawing of an example of a networked environment including a management system and a client device.

With reference to FIG. 1, shown is an example of a networked environment 100. The networked environment 100 can include a management system 106 and a client device 109 in communication with one another over a network 112. An enterprise can issue the client device 109 to a user, or the client device 109 can be provided by the user. The client device 109 can be enrolled with a management service 130 of the management system 106. The client device 109 can be representative of multiple client devices 109. The client device 109 can run an operating system that permits enrollment and management of the device by a remotely executed management service 130, such as the Android operating system, iOS®, Microsoft Windows®, or other operating systems with management APIs.

The network 112 can include, for example, the Internet, intranets, extranets, wide area networks (WANs), local area networks (LANs), wired networks, wireless networks, other suitable networks, or any combination of two or more networks. For example, the networks can include satellite networks, cable networks, Ethernet networks, telephony networks, and other types of networks.

The management system 106 can include, for example, a server computer or any other system providing computing capability. Alternatively, the management system 106 can include a plurality of computing devices that are arranged, for example, in one or more server banks, computer banks, or other arrangements. The management systems 106 can include a grid computing resource or any other distributed computing arrangement. The computing devices can be located in a single installation or can be distributed among many different geographical locations. The management systems 106 can also include or be operated as one or more virtualized computer instances. For purposes of convenience, the management system 106 is referred to herein in the singular. Even though the management system 106 is referred to in the singular, it is understood that a plurality of management systems 106 can be employed in the various arrangements as described above.

The management system 106 executes a management service 130 to oversee the management of the client devices

109. An enterprise can utilize the management service 130 to oversee or manage the operation of the client devices 109 of its employees, contractors, customers, students, or other users having user accounts with the enterprise. The management service 130 can remotely configure the client device 109 by interacting with an agent application, a management component 177 that is executed on the client device 109.

The management system 106 can execute an application that provides a user interface into the management capabilities of the management service 130. For example, an administrative console 132, through an application, web application, and/or network site, can provide a user interface for administration of the management service 130. The administrative console 132 can also provide for the creation of network whitelist or blacklist rules that can be enforced for specified applications on enrolled client devices 109.

The management service 130 can transmit various software components to the client device 109, which are then installed or configured by the management component 177. Software components can include, for example, additional applications 175, profiles, policies, resources, libraries, drivers, device configurations, or other similar components that require installation on the client device 109 as specified by an administrator of the management service 130. The management service 130 can further cause policies to be implemented on a client device 109. Policies can include, for example, restrictions or permissions pertaining to capabilities of a client device 109. For instance, policies can require certain hardware or software functions of the client device 109 to be enabled or be disabled during a certain time period or when the client device 109 is physically located at a particular location. Policies can be implemented by the management component 177.

The management service 130 can have a command queue storing at least one action to perform on the particular client device 109 upon check-in of the client device 109. For instance, the management component 177 can cause the client device 109 to check-in with the management service, identify an action in the command queue, and perform the action. An action can be the installation of a management profile, or the execution of a command or other actions to install software components or implement policies. A management profile can include a set of attributes, features, services, configurations, and settings that are associated with a device and/or a user. In some cases, the management component 177 can cause a check-in of the client device 109 periodically, on a schedule, or upon an event such as entering a physical location, changing a state of the client device 109, or installing an application on the client device 109. In one example, the contents of the command queue can include a command that the management component 177 causes to be executed on the client device 109. In another example, the contents of the command queue can include a resource or an application 175 that the management component 177 causes to be installed on the client device 109, which the client device 109 may access through a specified uniform resource identifier (URI) or a uniform resource locator (URL).

Also, the management service 130 can request that the client device 109 check-in using a notification service like APPLE® Push Notification Service (APNS), GOOGLE® Cloud Messaging (GCM), or WINDOWS® Push Notification Services (WNS). For example, the management service 130 can transmit a request to the notification service requesting that the client device 109 check-in. The notification service can push or otherwise route a notification to the client device 109. Once the notification is received, the management component 177 can cause the client device 109 to check-in with the management service 130. As described above, the management component 177 can determine whether a command queue provided by the management service 130 for the respective client device 109 contains any commands or resources for the client device 109, and, if so, can cause the commands or resources to be downloaded and/or implemented on the client device 109.

The data store 127 can include storage resources accessible to the management service 130, memory of the management system 106, mass storage resources of the management system 106, or any other storage resources on which data can be stored by the management system 106. The data stored in the data store 127 can include, for example, device data 135, enterprise data 138, compliance rules 141, a network whitelist 143, a network blacklist 145, and other data.

Generally, device data 135 includes data associated with a configuration of a client device 109 enrolled or managed by the management service 130. The device data can include an identifier of the client device 109. The identifier can be a serial number, media access control (MAC) address, other network address, or another device identifier. Device data 135 can also include data pertaining to a user of each client device 109. In addition, the device data 135 can include an enrollment status indicating whether a client device 109 has been enrolled with the management service 130. In one example, a client device 109 designated as "enrolled" can be permitted to access the enterprise data 138 while a client device 109 designated as "not enrolled," or having no designation, can be denied access to the enterprise data 138.

Additionally, device data 135 can include indications of the state of the client device 109. In one example, these indications can specify applications that are installed on the client device 109, configurations or settings that are applied to the client device 109, user accounts associated with the client device 109, the physical location of the client device 109, the network to which the client device 109 is connected, and other information describing the current state of the client device 109.

Further, device data 135 can also include data pertaining to organization groups. The device data 135 can include a device record associated with each client device 109. The device record(s) can include a file or table that includes the device data 135 that is associated with each client device 109. A device record format for client devices 109 that use a management platform can be different from a device record for client devices 109 that do not use the management platform.

Compliance rules 141 can include, for example, configurable criteria that must be satisfied for an enrolled one of the client devices 109 to be "in compliance" with the management service 130. The compliance rules can be based on a number of factors including geographical location of the client device 109, activation status, enrollment status, authentication data including authentication data obtained by a device registration system, time, and date, and network properties, among other factors. The compliance rules can also be determined based on a user profile associated with a user. The user profile can be identified by obtaining authentication data associated with the client device 109. The user profile can be associated with compliance rules that are further determined based on time, date, geographical location and network properties detected by the client device 109. The user profile can further be associated with an organization group, and compliance rules can be determined in view of the organization group.

Compliance rules 141 can include predefined constraints that must be met in order for the management service 130, or other applications, to permit access to the enterprise data 138 or other features of the client device 109. In some examples, the management service 130 communicates with a management application, a migration application, or another application 175 executable on the client device 109 to determine whether states exist on the client device 109 that do not satisfy one or more compliance rules 141. Some of these states can include, for example, a virus or malware being detected on the client device 109; installation or execution of a blacklisted application 175; or a client device 109 being "rooted" or "jailbroken," where root access is provided to a user of the client device 109. Additional states can include the presence of particular files, questionable device configurations, vulnerable versions of applications 175, or other vulnerability, as can be appreciated. In some examples, the compliance rules 141 can be configured in the management service 130, as specified by an administrator through a user interface of the management service 130.

Client devices 109 can also be organized into organization groups. Group data can include information pertaining to various organization groups of an enterprise. An administrator can specify one or more of the client devices 109 as belonging to an organization group. Organization groups can be created by an administrator of the management service 130 so a batch of client devices 109 can be configured according to common settings. For instance, an enterprise can create respective organization groups for the marketing department and the sales department, where the client devices 109 in the marketing department are configured differently from the client devices 109 in the sales department. A group can be associated with particular management profiles, policies, applications, data formats, and other configuration details.

A network whitelist 143 can identify applications 175 in an application repository, such as an application store or application marketplace, along with a network whitelist rule for each identified application 175. For example, an administrator can define a network whitelist rule for a particular application that is distributed by or approved for installation by the enterprise on a client device 109. The network whitelist rule can specify whether the application is permitted to communicate over a cellular network connection of the client device 109 or particular Wi-Fi network connections of the client device 109. In other words, the whitelist network rule can identify particular network states that an application is entitled to access a network connection of the client device 109. In one example, the network whitelist can specify that a particular application is permitted to access the network connection of the client device 109 only when the network state matches the state that is specified by the network whitelist rule.

In one example, a network whitelist rule can specify that an application 175 is permitted to access the network connection of the client device 109 to communicate with the network 112 when the client device 109 is connected to a managed Wi-Fi network. In this scenario, a managed Wi-Fi network is a Wi-Fi network for which the management service 130 has configured or pushed credentials to the management component 177. In this scenario, if the client device 109 is connected to any other Wi-Fi network, or an unmanaged Wi-Fi network, the particular application 175 is not permitted to access the network connection of the client device 109. If the client device 109 is only connected to a cellular network, the application 175 is not permitted to access the network connection of the client device 109.

In another example, a network whitelist rule can specify that an application 175 is permitted to access the network connection of the client device 109 when the client device 109 is connected to an unmanaged Wi-Fi network. In this scenario, if the client device 109 is connected to a managed Wi-Fi network, the application 175 is not permitted to access the network connection of the client device 109. If the client device 109 is only connected to a cellular network, the application 175 is not permitted to access the network connection of the client device 109.

In another example, a network whitelist rule can specify that an application 175 is permitted to access the network connection of the client device 109 when the client device 109 is not connected to a Wi-Fi network. In this scenario, if the client device 109 is connected to a Wi-Fi network, the application 175 is not permitted to access the network connection of the client device 109. If the client device 109 is only connected to a cellular network, the application 175 is permitted to access the network connection of the client device 109.

A network whitelist 143 can identify applications 175 to which it applies by identifying an application identifier, which can be a bundle identifier, or any other identifier that uniquely identifies an application 175 with respect to other applications 175 on the client device 109.

A network blacklist 145 can identify applications 175 in an application repository, such as an application store or application marketplace, along with a network blacklist rule for each identified application 175. For example, an administrator can define a network blacklist rule for a particular application that is distributed by or approved for installation by the enterprise on a client device 109. The network blacklist rule can specify conditions under which the application 175 is not permitted or is restricted from communicating over a cellular network connection of the client device 109 or particular Wi-Fi network connections of the client device 109. In other words, the blacklist network rule can identify particular network states that an application is not entitled to access a network connection of the client device 109. The application 175 can be permitted to access the network connection in all other instances. In one example, the network blacklist 145 can specify that a particular application is not permitted to access the network connection of the client device 109 when the network state matches the state that is specified by the network blacklist rule.

In one example, a network blacklist rule can specify that an application 175 is not permitted to access the network connection of the client device 109 to communicate with the 112 when the client device 109 is connected to a managed Wi-Fi network. In this scenario, a managed Wi-Fi network is a Wi-Fi network for which the management service 130 has configured or pushed credentials to the management component 177. In this scenario, if the client device 109 is connected to any other Wi-Fi network, or an unmanaged Wi-Fi network, the particular application 175 is permitted to access the network connection of the client device 109. If the client device 109 is only connected to a cellular network, the application 175 is permitted to access the network connection of the client device 109.

In another example, a network blacklist rule can specify that an application 175 is not permitted to access the network connection of the client device 109 when the client device 109 is connected to an unmanaged Wi-Fi network. In this scenario, if the client device 109 is connected to a managed Wi-Fi network, the application 175 is permitted to access the network connection of the client device 109. If the client device 109 is only connected to a cellular network, the application 175 is permitted to access the network connection of the client device 109.

In another example, a network whitelist rule can specify that an application 175 is not permitted to access the network connection of the client device 109 when the client device 109 is connected to a Wi-Fi network. In this scenario, if the client device 109 is connected to a Wi-Fi network, the application 175 is not permitted to access the network connection of the client device 109. If the client device 109 is only connected to a cellular network, the application 175 is permitted to access the network connection of the client device 109.

A network blacklist 145 can identify applications 175 to which it applies by identifying an application identifier, which can be a bundle identifier, or any other identifier that uniquely identifies an application 175 with respect to other applications 175 on the client device 109.

The client device 109 can be representative of one or more client devices 109. The client device 109 can include a processor-based system, such as a computer system, that can include a desktop computer, a laptop computer, a personal digital assistant, a cellular telephone, a smartphone, a set-top step, a music player, a tablet computer system, a game console, an electronic book reader, a smartwatch, or any other device with like capability. The client device 109 can have an operating system 170 that can perform functionalities and execute applications. The client device 109 can also execute applications 175, a management component 177 and/or other applications. Some of the applications 175 can be deployed onto the client device 109 by the management service 130 through the management component 177. Other applications 175 can be downloaded and installed by a user from a n application repository. For some client devices 109, the operating system 170 can be part of a management platform and can be considered a management platform operating system (OS) that supports management platform features like multilayered protection, application-level security, and separation of enterprise data from personal data. For other client devices 109, the operating system 170 can be a non-management platform OS that does not support management platform features.

The client device 109 can also be equipped with networking capability or networking interfaces, including a localized networking or communication capability, such as a near-field communication (NFC) capability, radio-frequency identification (RFID) read or write capability, or other localized communication capability. In some embodiments, the client device 109 is mobile where the client device 109 is easily portable from one location to another. The operating system 170 can control access to the network 112 by applications 175 that are installed on the client device 109. According to embodiments of the disclosure, access to the network 112 or networking capabilities of the operating system 170 and thus the client device 109 can be controlled through use of the network whitelist 143 and/or network blacklist 145.

To this end, the management component 177 can obtain the network whitelist 143 and network blacklist 145 and save them within a data store 127 that is local to the client device 109. The local copies of the whitelist and blacklist can be consulted by the management component when modifying the network access permissions of the various applications 175 installed on the client device 109. Accordingly, an administrator can determine the network access permissions of applications that a user might install or that might be deployed onto the client device 109, and the network whitelist 143 and network blacklist 145 can be deployed to the management component 177 associated with the various client devices 109 that are enrolled with the management service 130.

In one implementation, when the user enrolls his or her device as a managed device, the management component 177 is installed with elevated or administrator privileges such that it can take actions with respect to operating system network permissions of various applications. In particular, in an Android for Work® or Android for Enterprise® deployment, the management component 177 can modify operating system parameters or permissions regarding network access of an application. Accordingly, the management component 177 can monitor the network state of the client device 109 and adjust the various operating system network permissions of applications 175 installed on the device to be consistent with the rules specified by the network whitelist 143 and network blacklist 145.

As the network state of the client device 109 changes, so do the permission of applications 175 to access the network connection of the client device 109. Accordingly, reference is now made to FIGS. 2-3, which illustrates various approaches to enforcing the network whitelist 143 and network blacklist 145.

Figure 2:
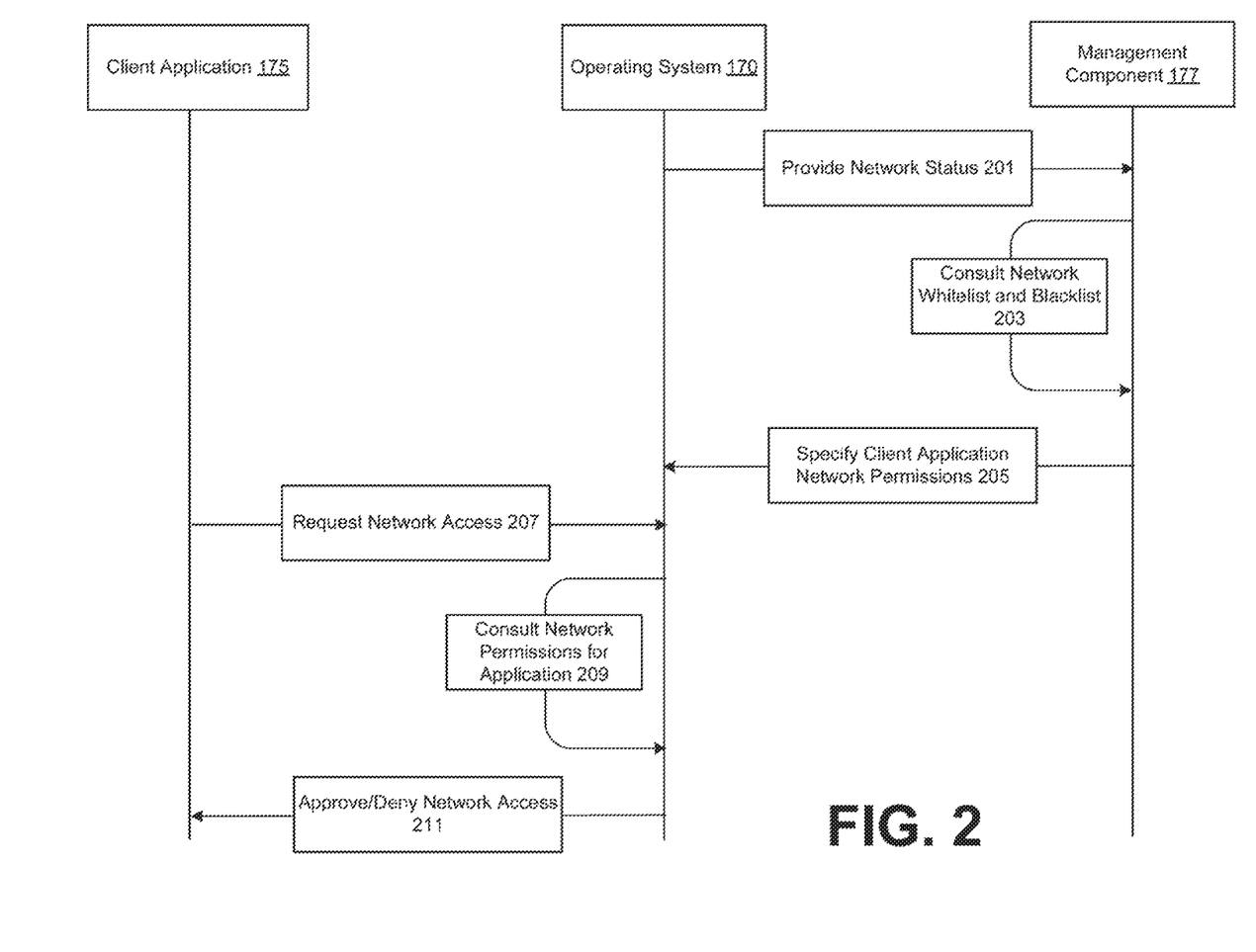
FIG. 2 is a sequence diagram illustrating functionality implemented by components of the networked environment.

In FIG. 2, shown is a sequence diagram illustrating steps performed by components of the networked environment 100 for enforcing a network whitelist 143 and network blacklist 145 on a client device 109 that is enrolled with the management service 130 as a managed device. In the sequence depicted in FIG. 2, it is assumed that the management component 177 has obtained the network whitelist 143 and/or network blacklist 145 from the management service 130. Additionally, in some examples, the management service 130 can provision one or more managed Wi-Fi network credentials onto the client device 109 through the management component 177. In this scenario, the management component 177 can log which Wi-Fi networks have been provisioned on the client device 109 by the management service 130.

First, at step 201, the operating system 170 can provide the network state or network status of the client device 109 to the management component 177. The network state of the client device 109 can specify which network or networks to which the client device 109 is connected. For example, the network state can identify the cellular networks and Wi-Fi networks, if any, to which the client device 109 is currently connected. In one implementation, whenever the network state of the client device 109 changes, the operating system 170 can provide the network state to the management component 177. In one example, the management component 177 subscribes to alerts from the operating system 170 regarding the network state of the client device 109 to the management component 177.

Upon receiving the network state of the client device 109, the management component 177 can consult the network whitelist 143 and network blacklist 145 obtained from the management service 130 to determine whether any applications 175 installed on the client device 109 are required to have their respect abilities to access the network connection of the client device 109 adjusted. For example, if the client device 109 connects to a different Wi-Fi network that is a managed Wi-Fi network, the management component 177 can determine whether the network whitelist 143 or network blacklist 145 specify network access permissions that require modification. For example, if the client device 109 connects to a different Wi-Fi network that is an unmanaged Wi-Fi network, the management component 177 can determine whether the network whitelist 143 or network blacklist 145 specify network access permissions that require modification.

In many Android for Work® or Android Enterprise® implementations, the management component 177 is installed with privileges that allow it to modify operating system permissions for installed applications 175. Among these permissions are network access permissions. In one scenario, there are three possible values for a network access permission for an application: allow, deny, or default. In the "allow" case, the application 175 is permitted to access the network connection of the client device 109. In the "deny" case, the application 175 is not permitted to access the network connection of the client device 109. In the "default" case, the user is prompted to allow or deny access to the network connection of the client device 109.

At 203, the management component 177 can consult the network whitelist 143 and network blacklist 145 to determine whether the network status requires updating of client application network permissions.

Accordingly, at 205, upon consulting the network access permissions specified by the network whitelist 143 or network blacklist 145, the management component 177 can modify the operating system network permissions of the applications 175 installed on the client device 109 in response to the network state received from the operating system 170. The changes in the operating system network permissions can grant or deny access to the network connection for the installed applications 175.

Subsequent to a change in the network state, the application 175 might request access to the network connection of the client device 109 through the operating system 170, which is shown in step 207. In one scenario, such a request can take the form of the application 175 requesting to send a packet or other data via the network stack of the operating system 170.

At step 209, the operating system 170 can determine whether to grant or deny access to the network connection of the client device 109 based upon the operating system network permission that is specified for the installed application 175.

At step 211, the operating system 170 can either approve or deny access to the network connection based upon the defined permission. In the event that the network permission is set to "allow," or an analogous value, the operating system 170 can forward the packet or data being sent by the application 175. In the event that the network permission is set to "deny," or an analogous value, the operating system 170 can return an error to the application 175.

Figure 3:
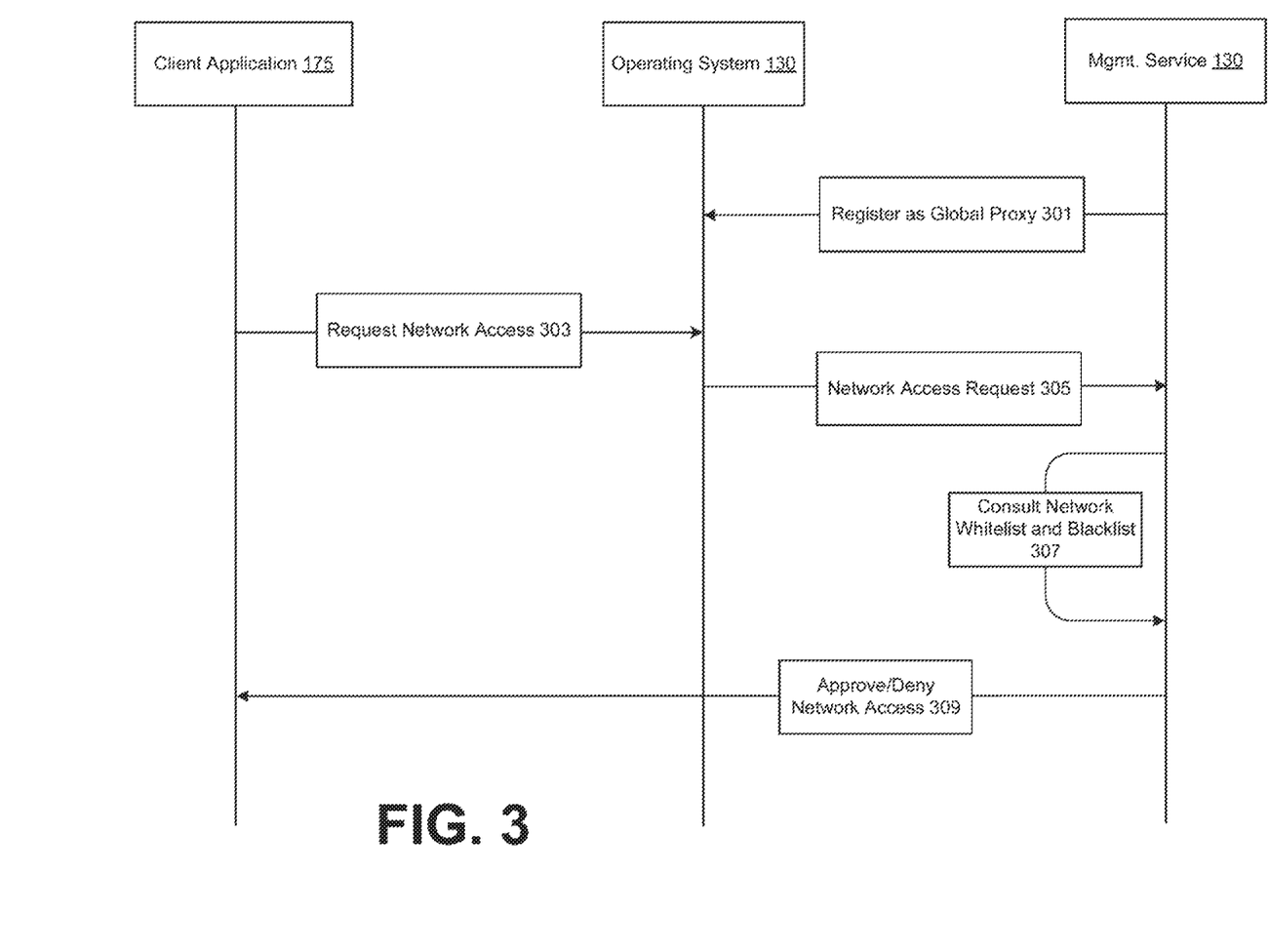
FIG. 3 is a sequence diagram illustrating functionality implemented by components of the networked environment.

In FIG. 3, shown is a sequence diagram illustrating steps performed by components of the networked environment 100 for enforcing a network whitelist 143 and network blacklist 145 on a client device 109 that is enrolled with the management service 130 as a managed device. In the sequence depicted in FIG. 3, it is assumed that the management component 177 has obtained the network whitelist 143 and/or network blacklist 145 from the management service 130. Additionally, in some examples, the management service 130 can provision one or more managed Wi-Fi network credentials onto the client device 109 through the management component 177. In this scenario, the management component 177 can log which Wi-Fi networks have been provisioned on the client device 109 by the management service 130. FIG. 3 also depicts an alternative approach to enforcing the network whitelist 143 and/or network blacklist 145 on the various applications 175 that are installed on the client device 109.

First, at step 301, the management component 130 can register as the global proxy for all network traffic, for all HTTP traffic, all HTTPS traffic, or any combination thereof. In many platforms, such as the Android operating system, an application can register as a network proxy through which certain or all network traffic is routed. In some cases, the application that registers as the global proxy must be an application that is installed with elevated privileges. For example, the application that registers as the global proxy might be required to be the device administrator in order to register as the global proxy on the device.

In an example of the disclosure, the application registering as the global proxy can be the management component 177, which can obtain the network whitelist 143 and network blacklist 145 from the management service 130. As the global proxy on the client device 109 through which network traffic is routed, the management component 177 can enforce the network whitelist 143 and network blacklist 145 on the applications 175 that are installed on the client device 109 and that attempt to access the network connection of the client device 109. In some implementations of this disclosure, another application can register as the global proxy and enforce network access restrictions on behalf of the management component 177.

As the global proxy of the operating system 170, the management component 177 can obtain the network state of the client device 109. Again, the network state of the client device 109 can specify which network or networks to which the client device 109 is connected. For example, the network state can identify the cellular networks and Wi-Fi networks, if any, to which the client device 109 is currently connected.

At step 303, an application 175 installed on the client device 109 can request access to the network connection of the client device 109 through the operating system 170. In one scenario, such a request can take the form of the application 175 requesting to send a packet or other data via the network stack of the operating system 170.

At step 305, the operating system 170 can determine that the management service 130 has registered as the global proxy on the device and forward the request to the management component 177 for processing. Again, as the global network proxy on the client device 109, all network traffic can be routed through the management component 177.

At step 307, the management component 177 can consult the network whitelist 143 and network blacklist 145 obtained from the management service 130 to determine whether the request should be routed to its destination based upon the current network state of the client device 109. For example, if the client device 109 connects to a different Wi-Fi network that is a managed Wi-Fi network, the management component 177 can determine whether the network whitelist 143 or network blacklist 145 specify that the request should be routed to its requested destination.

At step 309, the management component 177 can determine whether to grant or deny access to the network connection of the client device 109 based upon the operating system network permission that is specified for the installed application 175. In some cases, the management component 177 can return an error message to the application 175 in the event that a request is denied based upon a rule specified in a network whitelist 143 or network blacklist 145. In the event of a request being granted, the management component 177 can route the network traffic from the application 175 to its destination.

Figure 4:
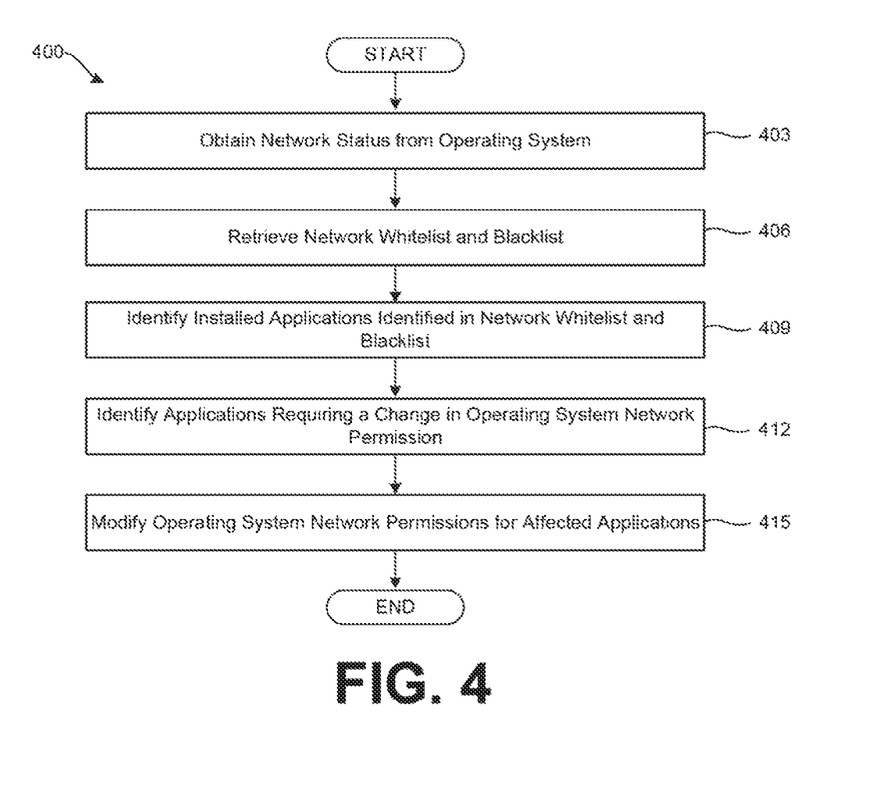
FIGS. 4-5 are flowcharts illustrating functionality implemented by components of the networked environment.

FIG. 4 shows a flowchart 400 that illustrates an example of the operation of the management component 177 for enforcing network access permissions for applications 175 according to the approach depicted in FIG. 2.

In the method depicted in FIG. 4, it is assumed that the management component 177 has obtained the network whitelist 143 and/or network blacklist 145 from the management service 130. Additionally, in some examples, the management service 130 can provision one or more managed Wi-Fi network credentials onto the client device 109 through the management component 177. In this scenario, the management component 177 can log which Wi-Fi networks have been provisioned on the client device 109 by the management service 130.

First, at step 403, the management component 177 can obtain from the operating system 170 the network state or network status of the client device 109. The network state of the client device 109 can specify which network or networks to which the client device 109 is connected. For example, the network state can identify the cellular networks and Wi-Fi networks, if any, to which the client device 109 is currently connected. In one implementation, whenever the network state of the client device 109 changes, the operating system 170 can provide the network state to the management component 177. In one example, the management component 177 subscribe to alerts from the operating system 170 regarding the network state of the client device 109 to the management component 177.

At step 406, the management component 177 can obtain the network whitelist 143 and/or network blacklist 145 that is installed on the client device 109. As noted above, the management service 130 can deploy the network whitelist 143 and network blacklist 145 onto the client device 109. The network whitelist 143 and network blacklist 145 can specify the network access rules that apply to applications 175 that might be installed on the client device 109.

At step 409, the management component 177 can consult the network whitelist 143 and network blacklist 145 obtained from the management service 130 to identify applications 175 installed on the client device 109 that are identified by a network whitelist 143 and/or network blacklist 145.

At step 412, the management component 177 can determine whether any applications 175 installed on the client device 109 are required to have their respective abilities to access the network connection of the client device 109 adjusted. For example, if the client device 109 connects to a different Wi-Fi network that is a managed Wi-Fi network, the management component 177 can determine whether the network whitelist 143 or network blacklist 145 specify network access permissions that require modification. For example, if the client device 109 connects to a different Wi-Fi network that is an unmanaged Wi-Fi network, the management component 177 can determine whether the network whitelist 143 or network blacklist 145 specify network access permissions that require modification.

In many Android for Work® or Android Enterprise® implementations, the management component 177 is installed with privileges that allow it to modify operating system permissions for installed applications 175. Among these permissions are network access permissions. In one scenario, there are three possible values for a network access permission for an application: allow, deny, or default. In the "allow" case, the application 175 is permitted to access the network connection of the client device 109. In the "deny" case, the application 175 is not permitted to access the network connection of the client device 109. In the "default" case, the user is prompted to allow or deny access to the network connection of the client device 109.

Accordingly, at step 415, upon consulting the network access permissions specified by the network whitelist 143 or network blacklist 145, the management component 177 can modify the operating system network permissions of the applications 175 installed on the client device 109 in response to the network state received from the operating system 170. The changes in the operating system network permissions can grant or deny access to the network connection for the installed applications 175.

Subsequent to a change in the network state, the application 175 might request access to the network connection of the client device 109 through the operating system 170. In one scenario, such a request can take the form of the application 175 requesting to send a packet or other data via the network stack of the operating system 170. The operating system 170 can determine whether to grant or deny access to the network connection of the client device 109 based upon the operating system network permission that is specified for the installed application 175. Thereafter, the process can proceed to completion until a subsequent change in the network state of the client device 109.

Figure 5:
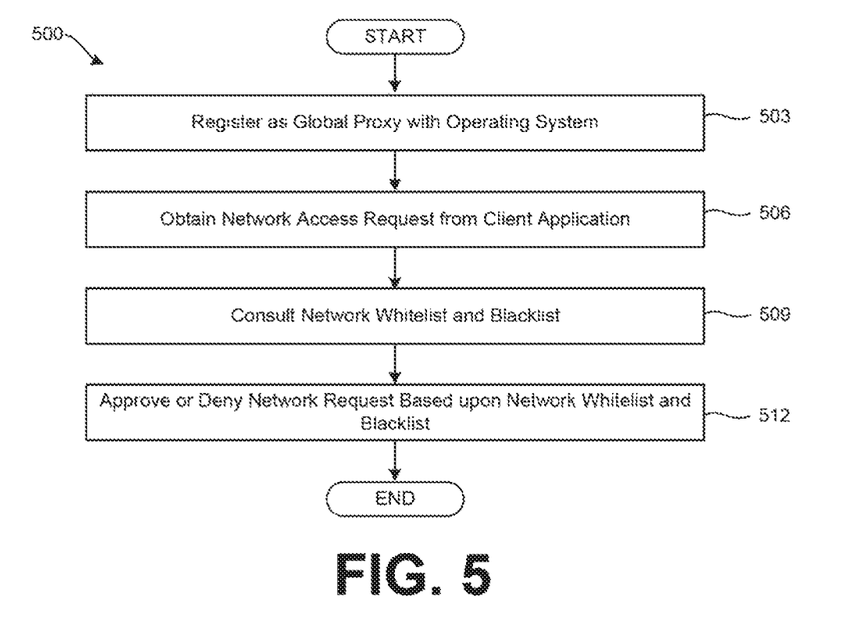

FIG. 5 shows a flowchart 500 that illustrates an example of the operation of the management component 177 for enforcing network access permissions for applications 175 according to the approach depicted in FIG. 3. The management component 177 can enforce a network whitelist 143 and network blacklist 145 on a client device 109 that is enrolled with the management service 130 as a managed device. In the method depicted in FIG. 5, it is assumed that the management component 177 has obtained the network whitelist 143 and/or network blacklist 145 from the management service 130. Additionally, in some examples, the management service 130 can provision one or more managed Wi-Fi network credentials onto the client device 109 through the management component 177. In this scenario, the management component 177 can log which Wi-Fi networks have been provisioned on the client device 109 by the management service 130.

First, at step 503, the management component 130 can register as the global proxy for all network traffic, for all HTTP traffic, all HTTPS traffic, or any combination thereof. In many platforms, such as the Android operating system, an application can register as a network proxy through which certain or all network traffic is routed. In some cases, the application that registers as the global proxy must be an application that is installed with elevated privileges. For example, the application that registers as the global proxy might be required to be the device administrator in order to register as the global proxy on the device.

In an example of the disclosure, the application registering as the global proxy can be the management component 177, which can obtain the network whitelist 143 and network blacklist 145 from the management service 130. As the global proxy on the client device 109 through which network traffic is routed, the management component 177 can enforce the network whitelist 143 and network blacklist 145 on the applications 175 that are installed on the client device 109 and that attempt to access the network connection of the client device 109. In some implementations of this disclosure, another application can register as the global proxy and enforce network access restrictions on behalf of the management component 177.

As the global proxy of the operating system 170, the management component 177 can obtain the network state of the client device 109. Again, the network state of the client device 109 can specify which network or networks to which the client device 109 is connected. For example, the network state can identify the cellular networks and Wi-Fi networks, if any, to which the client device 109 is currently connected.

At step 506, the management component 175 can obtain a request to access the network connection of the client device 109 that is made on behalf of an application 175 installed on the client device 109. The request can be obtained from the operating system 170, which can forward the request to the management component 177 or directly from the application 175. In one scenario, such a request from the application 175 can take the form of the application 175 requesting to send a packet or other data via the network stack of the operating system 170.

At step 509, the management component 177 can consult the network whitelist 143 and network blacklist 145 obtained from the management service 130 to determine whether the request should be routed to its destination based upon the current network state of the client device 109. For example, if the client device 109 connects to a different Wi-Fi network that is a managed Wi-Fi network, the management component 177 can determine whether the network whitelist 143 or network blacklist 145 specify that the request should be routed to its requested destination.

At step 512, the management component 177 can determine whether to grant or deny access to the network connection of the client device 109 based upon the operating system network permission that is specified for the installed application 175. In some cases, the management component 177 can return an error message to the application 175 in the event that a request is denied based upon a rule specified in a network whitelist 143 or network blacklist 145. In the event of a request being granted, the management component 177 can route the network traffic from the application 175 to its destination. Thereafter, the process proceeds to completion. Upon receiving a subsequent request from or on behalf of an application 175 to access the network connection of the client device 109, the method can proceed from step 506 until completion, as the management component 177 or another application on behalf of the management component 177 has been registered as the global proxy on the client device 109.

A number of software components are stored in the memory and executable by a processor. In this respect, the term "executable" means a program file that is in a form that can ultimately be run by the processor. Examples of executable programs can be, for example, a compiled program that can be translated into machine code in a format that can be loaded into a random access portion of one or more of the memory devices and run by the processor, code that can be expressed in a format such as object code that is capable of being loaded into a random access portion of the one or more memory devices and executed by the processor, or code that can be interpreted by another executable program to generate instructions in a random access portion of the memory devices to be executed by the processor. An executable program can be stored in any portion or component of the memory devices including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

Memory can include both volatile and nonvolatile memory and data storage components. Also, a processor can represent multiple processors and/or multiple processor cores, and the one or more memory devices can represent multiple memories that operate in parallel processing circuits, respectively. Memory devices can also represent a combination of various types of storage devices, such as RAM, mass storage devices, flash memory, or hard disk storage. In such a case, a local interface can be an appropriate network that facilitates communication between any two of the multiple processors or between any processor and any of the memory devices. The local interface can include additional systems designed to coordinate this communication, including, for example, performing load balancing. The processor can be of electrical or of some other available construction.

The client devices 109 can include a display upon which a user interface generated by the application 175 or another application can be rendered. In some examples, the user interface can be generated with user interface data provided by the management service 130. The client device 109 can also include one or more input/output devices that can include, for example, a capacitive touchscreen or other type of touch input device, fingerprint reader, or keyboard.

Although the management service 130, applications 175, management component 177, and other various services and functions described herein can be embodied in software or code executed by general purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include discrete logic circuits having logic gates for implementing various logic functions upon an application of one or more data signals, application specific integrated circuits (ASICs) having appropriate logic gates, field-programmable gate arrays (FPGAs), or other components.

The sequence diagram and flowcharts show examples of the functionality and operation of an implementation of portions of components described herein. If embodied in software, each block can represent a module, segment, or portion of code that can include program instructions to implement the specified logical function(s). The program instructions can be embodied in the form of source code that can include human-readable statements written in a programming language or machine code that can include numerical instructions recognizable by a suitable execution system such as a processor in a computer system or other system. The machine code can be converted from the source code. If embodied in hardware, each block can represent a circuit or a number of interconnected circuits to implement the specified logical function(s).

Although the sequence diagram and flowcharts show a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, in some embodiments, one or more of the blocks shown in the drawings can be skipped or omitted.

Also, any logic or application described herein that includes software or code can be embodied in any non-transitory computer-readable medium for use by or in connection with an instruction execution system such as a processor in a computer system or other system. In this sense, the logic can include, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can include any one of many physical media, such as magnetic, optical, or semiconductor media. More specific examples of a suitable computer-readable medium include solid-state drives or flash memory. Further, any logic or application described herein can be implemented and structured in a variety of ways. For example, one or more applications can be implemented as modules or components of a single application. Further, one or more applications described herein can be executed in shared or separate computing devices or a combination thereof. For example, a plurality of the applications described herein can execute in the same computing device, or in multiple computing devices.

It is emphasized that the above-described embodiments of the present disclosure are merely possible examples of implementations described for a clear understanding of the principles of the disclosure. Many variations and modifications can be made to the above-described embodiments without departing substantially from the spirit and principles of the disclosure. All such modifications and variations are intended to be included herein within the scope of this disclosure.

What is claimed is:

1. A system, comprising:
   a client device; and
   a management component executable in the client device that, when executed, causes the at least one computing device to:
      initiate enrollment of the client device with a management service based upon a user credential associated with a user account accessible to the management service;
      obtain a network whitelist associated with the user account, the network whitelist identifying an application and a respective network permission associated with the application, the respective network permission specifying at least one condition under which the application is permitted to access a network connection;
      determine a current network status of the client device;
      determine that the application is allowed to access or disallowed from accessing the network connection based upon the current network status; and
      modify an operating system network permission associated with the application based upon the determination that the application is allowed to access or disallowed from accessing the network connection.

2. The system of claim 1, wherein the operating system network permission comprises at least one of an Android Internet permission or an Android network state access permission.

3. The system of claim 1, wherein the respective network permission specifies whether the application is permitted to access the network connection when the client device is connected to a particular WiFi network.

4. The system of claim 1, wherein the management component is configured to block a request from the application to access the network connection when the current network status is inconsistent with the respective network permission specified by the network whitelist, wherein the request is blocked by modifying the operating system network permission.

5. The system of claim 1, wherein the management component further causes the at least one computing device to obtain a network blacklist associated with the user account, the network blacklist identifying another application and another respective network permission associated with the other application, the other respective network permission specifying at least one condition under which the application is not permitted to access the network connection.

6. The system of claim 1, wherein when executed the management service further causes the at least one computing device to block a request from the application to access the network connection when the current network status is specified by the other respective network permission specified by the network blacklist.

7. The system of claim 1, wherein when executed the management service further causes the at least one computing device to permit the application to access the network connection when the current network status is not specified by the other respective network permission specified by the network blacklist, wherein the application is permitted by modifying the operating system network permission.

8. The system of claim 1, wherein when executed the management service further causes the at least one computing device to block the application from accessing the network connection when the current network status is specified by the other respective network permission specified by the network blacklist, wherein the application is blocked by modifying the operating system network permission.

9. A method implemented by a management component installed on a client device, comprising:
   initiating enrollment of the client device with a management service based upon a user credential associated with a user account accessible to the management service;
   obtaining a network whitelist associated with the user account, the network whitelist identifying an application and a respective network permission associated with the application, the respective network permission specifying at least one condition under which the application is permitted to access a network connection;
   determining a current network status of the client device;
   determining that the application is allowed to access or disallowed from accessing the network connection based upon the current network status; and
   modifying an operating system network permission associated with the application based upon the determination that the application is allowed to access or disallowed from accessing the network connection.

10. The method of claim 9, wherein the operating system network permission comprises at least one of an Android Internet permission or an Android network state access permission.

11. The method of claim 9, wherein the respective network permission specifies whether the application is permitted to access the network connection when the client device is connected to a particular WiFi network.

12. The method of claim 9, further comprising blocking a request from the application to access the network connection when the current network status is inconsistent with the respective network permission specified by the network whitelist, wherein the request is blocked by modifying the operating system network permission.

13. The method of claim 9, wherein the management component is installed on the client device as a device administrator.

14. The method of claim 9, further comprising obtaining a network blacklist associated with the user account, the network blacklist identifying another application and another respective network permission associated with the other application, the other respective network permission specifying at least one condition under which the application is not permitted to access the network connection.

15. The method of claim 9, further comprising blocking a request from the application to access the network connection when the current network status is specified by the other respective network permission specified by the network blacklist.

16. A non-transitory computer-readable medium embodying a management component executable in a client device that, when executed, causes the client device to:
- initiate enrollment of the client device with a management service based upon a user credential associated with a user account accessible to the management service;
- obtain a network whitelist associated with the user account, the network whitelist identifying an application and a respective network permission associated with the application, the respective network permission specifying at least one condition under which the application is permitted to access a network connection;
- determine a current network status of the client device;
- determine that the application is allowed to access or disallowed from accessing the network connection based upon the current network status; and
- modify an operating system network permission associated with the application based upon the determination that the application is allowed to access or disallowed from accessing the network connection.

17. The non-transitory computer-readable medium of claim 16, wherein the operating system network permission comprises at least one of an Android Internet permission or an Android network state access permission.

18. The non-transitory computer-readable medium of claim 16, wherein the respective network permission specifies whether the application is permitted to access the network connection when the client device is connected to a particular WiFi network.

19. The non-transitory computer-readable medium of claim 16, wherein the management component is configured to block a request from the application to access the network connection when the current network status is inconsistent with the respective network permission specified by the network whitelist, wherein the request is blocked by modifying the operating system network permission.

20. The non-transitory computer-readable medium of claim 16, wherein the management component is installed on the client device as a device administrator.

\* \* \* \* \*